(12) United States Patent
Lorenz

(10) Patent No.: US 6,996,970 B2
(45) Date of Patent: Feb. 14, 2006

(54) HIGH ACCURACY FUEL METERING SYSTEM FOR TURBINE ENGINES

(75) Inventor: William Lorenz, Dowagiac, MI (US)

(73) Assignee: Honeywell International Inc., Morristown, NJ (US)

( * ) Notice: Subject to any disclaimer, the term of this patent is extended or adjusted under 35 U.S.C. 154(b) by 140 days.

(21) Appl. No.: 10/723,904

(22) Filed: Nov. 26, 2003

(65) Prior Publication Data
US 2005/0066649 A1 Mar. 31, 2005

Related U.S. Application Data

(60) Provisional application No. 60/506,744, filed on Sep. 30, 2003.

(51) Int. Cl.
F02C 7/236 (2006.01)
F02C 9/26 (2006.01)

(52) U.S. Cl. ..................... 60/39.281; 60/734
(58) Field of Classification Search ............. 60/39.281, 60/734
See application file for complete search history.

(56) References Cited

U.S. PATENT DOCUMENTS

| 3,447,315 | A |   | 6/1969  | Long |
|-----------|---|---|---------|------|
| 3,946,551 | A |   | 3/1976  | Linebrink et al. |
| 4,048,964 | A |   | 9/1977  | Kissel |
| 4,208,871 | A |   | 6/1980  | Riple, Jr. |
| 4,815,278 | A |   | 3/1989  | White |
| 4,830,576 | A |   | 5/1989  | Patrick |
| 4,922,708 | A | * | 5/1990  | Nelson ........................ 60/734 |
| 6,189,313 | B1 |  | 2/2001  | Cass et al. |
| 6,532,727 | B1 |  | 3/2003  | Lundgren |
| 2001/0054290 | A1 | | 12/2001 | Herbison et al. |
| 2002/0038540 | A1 | | 4/2002  | Griffiths et al. |
| 2003/0074884 | A1 | | 4/2003  | Snow et al. |
| 2005/0013706 | A1 | * | 1/2005 | Jansen ..................... 417/413.1 |

FOREIGN PATENT DOCUMENTS

FR          2 685 735 A1      7/1993

* cited by examiner

Primary Examiner—Louis J. Casaregola
(74) Attorney, Agent, or Firm—Birch, Stewart, Kolasch and Birch, LLP.

(57) ABSTRACT

A fuel control system (10) in a turbine engine includes a centrifugal boost pump (20) that receives fuel from a fuel tank and increases the pressure of the fuel. A piston pump (40) boosts the fuel pressure to levels required by the turbine engine and meters an amount of fuel delivered to the turbine engine. A speed controlled electric motor (30) drives the piston pump (40). The electric motor (30) is driven by an electronic speed control wherein by controlling motor speed, fuel flow to the turbine engine is controlled, and fuel flow is directly proportional to the speed of the motor (30). Accordingly, the system (10) seeks precision of fuel control that can be achieved with an accuracy of better than +/−3% over a 30:1 fuel flow range.

12 Claims, 1 Drawing Sheet

HIGH ACCURACY FUEL METERING SYSTEM FOR TURBINE ENGINES

CROSS REFERENCE TO RELATED APPLICATION

This Nonprovisional application claims priority under 35 U.S.C. § 119(e) on U.S. Provisional Application No. 60/506,744 filed on Sep. 30, 2003, the entire contents of which are hereby incorporated by reference.

This invention was made with Government support under Contract No. N00019-02-C-3002 awarded by the United States Navy. The Government has certain rights in this invention.

BACKGROUND OF THE INVENTION

1. Field of the Invention

The present invention relates to a fuel metering system for turbine engines.

More specifically, the present invention relates to a highly accurate fuel metering system with a low leakage piston pump wherein fuel metering is accomplished by using a variable speed electric motor to drive the piston pump. Fuel flow is directly proportional to motor speed. With a brushless DC motor driving the piston pump speed can be accurately controlled.

2. Description of the Background Art

Many systems are known for controlling the supply of fuel in gas turbine engines and other types of engines. The typical gas turbine engine control system is complex and expensive if high fuel metering accuracy is required. In U.S. Pat. No. 3,447,315 to Long, a very early type of fuel system for gas turbine engines is described. A pump delivers fuel to an engine under the control of a throttle valve. A shut off valve is opened and the throttle valve permits passage of the fuel to a starter burner. There is no piston pump being driven by a DC motor to meter the fuel.

U.S. Pat. No. 3,946,551 to Linebrink et al relates to an electromechanical pumping and fuel metering device interfacing an electronic fuel control which is adapted for small engines. Linebrink et al comprises an engine driven centrifugal pump, a suitable metering pump, which is an electrically driven vane type of pump, and a pressure regulating valve. Fuel from a reservoir is delivered to a burner section of the power plant. The system is designed to permit the vane pump to pressurize the fuel to the required value during engine start up until idle speed is reached. This device is too small to be used with turbine engines and there is no piston pump driven by a speed controlled electric motor to meter fuel.

In U.S. Pat. No. 4,048,964 to Kissel, a closed loop, electronically controlled and regulated fuel metering system is described that operates an internal combustion engine. The system controls the mass ratio of fuel and air supplied. The air flow and fuel flow signals are measured by the fluid flowmeters and combined to cause the fuel to be delivered by a pump. The pump is a variable speed motor pump wherein the actual amount of fuel delivered and sensed by the flowmeter corresponds to the amount of fuel required to maintain the desired fuel-air ratio set by the controller. The effect of the motor current will cause the fuel pump to increase the fuel flow rate and the amount of the fuel supplied to the engine. However, the pump is not a piston pump and it is not driven by a speed controlled electric motor wherein the piston pump meters fuel to the turbine engine.

U.S. Pat. No. 4,208,871 to Riple, Jr. is directed to a fuel control system having a boost pump for pumping liquid fuel to a positive displacement pump which in turn meters the fuel to a fuel nozzle of a combustion engine. The system includes a fuel control system having independently operated pumping and metering devices. The metering device is controlled by a variable speed electric motor. An electronic control module controls the motor. When the engine requires low fuel volumes at relatively low pressures, the variable speed motor drives the pump at a relatively slow speed, and a substantial amount of fuel is supplied by the boost pump is bypassed to the fuel supply tank. At higher fuel demand and pressure conditions, the motor speed is increased, and the boost pump is not bypassed. In other words, the use of a piston pump to meter fuel to a turbine engine is not disclosed.

In U.S. Pat. No. 4,815,278 to White, an electrically driven fuel control system for a gas turbine engine is described. The system utilizes a combination of variation in power applied to an electrically powered drive of a positive displacement fuel pump and braking to achieve an optimized response characteristic approaching that of mechanically driven fuel systems directly driven from the gas turbine engine. In the preferred embodiment, for a decrease in fuel delivery exceeding a predetermined limit control of the electric drive for the fuel pump is achieved by braking. For decreases in fuel delivery having a magnitude less than the predetermined limit and for fuel increases, control is achieved by varying the power applied to the electric drive for the fuel pump. This is a different system than a piston pump driven by a brushless motor where the piston pump is used to meter the fuel to the turbine engine.

U.S. Pat. No. 4,830,576 to Patrick includes a metering fuel pump to feeding fuel containing vapor or air to an engine that includes a housing assembly. More specifically, the metering fuel pump attempts to discharging the fuel vapor out of the pump. A motor controller section controls the speed of the motor by regulating the flow of fuel. The motor controller section includes a brushless variable speed electric motor and a two-stage pump. The two-stage pump has a primary stage and secondary stage. The stages include a stationary cavity with a gerotor pump that includes an internal and external gear. The two-stage pump section imparts pressure to the fuel and encloses a cyclonic vapor separator section. Still, this system does not have a piston pump with a very high volumetric efficiency and very low leakage so that an amount of fuel pumped per revolution of the piston pump can be a known constant.

Published Application No. US2001/0054290 to Herbison et al. describes a fuel system for providing a desired fuel flow to an engine comprises a metering assembly for providing a variable portion of metered fuel flow to an associated nozzle system. The variable portion corresponds to a variable demand signal received by the metering assembly. A centrifugal pumping assembly is adapted to receive fuel from an associated pumping system. The centrifugal pumping assembly is capable of pressurizing and delivering adequate fuel flow to the metering assembly. A throttling valve is in fluid communication between the metering assembly and the centrifugal pumping assembly to maintain a constant pressure rise across the metering assembly. An electronic engine control provides the variable demand signal to the metering assembly. This system does not include a piston pump with a very high volumetric efficiency and low leakage so that the amount of fuel pumped per revolution of the piston pump is a known constant.

Published Application No. US 2002/0038540 to Griffiths et al. has a control system for use in controlling fuel supply to at least two sets of burners of an engine. The control system comprises two or more fuel pumps, each of the pumps being driven, in use, by a respective variable-speed motor. A control arrangement is provided for controlling the speed of the motors so as to regulate the rate of flow of fuel to each of the sets of burners. The use of two motors is inefficient in both cost and power.

SUMMARY OF THE INVENTION

A need exists for a reliable piston pump being driven by a brushless DC motor wherein fuel is directly proportional to motor speed. It is therefore an aspect of the present invention to provide a piston pump, driven by a speed controlled electric motor, which meters fuel to a turbine engine.

A further aspect of the invention is to have a system that also includes a boost pump, a fuel filter, a shutoff solenoid, a filter differential pressure sensor and a temperature sensor. The temperature sensor is included to allow calculations to be made which convert volumetric flow to mass flow.

An aspect of the invention is to provide a boost pump, which could be centrifugal, to receive fuel from a fuel tank and increase the pressure of the fuel. A piston pump boosts the fuel pressure to levels required by the turbine engine and meters an amount of fuel delivered to the turbine engine. The piston pump is driven by a speed controlled electric motor.

A further aspect of the invention is that an amount of the fuel pumped by the piston pump per revolution is constant, and that the fuel flow to the engine is controlled by the speed of the motor. In the present invention, the motor is a variable speed brushless DC motor and the motor drives both the boost pump and the piston pump.

Another aspect of the invention is to provide a solenoid for directing flow of the fuel to a discharge port when the solenoid is in an "on" condition or returns the fuel to an inlet of a fuel filter when the solenoid is in an "off" condition. The solenoid provides an independent on/off control of fuel to the turbine engine.

An aspect of the invention is to provide added safety measures wherein the system includes a filter bypass valve that opens should the fuel filter become plugged with dirt and debris, and a filter differential pressure sensor provides a signal to the aircraft that the filter pressure is increasing and may be nearing a plugged condition.

A further aspect of the invention is to prevent extremely high pressure situations by providing a pump relief valve should the metered flow discharge port be inadvertently blocked.

Another aspect of the invention is to provide a fuel temperature sensor which provides a signal proportional to fuel temperature, wherein the piston pump provides a flow volume proportional to speed, the fuel temperature is used to calculate mass flow as a function of speed and to allow for estimate of pump leakage as a function of fuel temperature.

Another aspect of the invention is to have the fuel filter pressure bypass valve be a spring loaded valve. The valve opens when the fuel filter is plugged to provide a flow of fuel to the piston pump under emergency conditions.

A still further aspect of the invention is to provide a three phase brushless DC motor. Also, there is a resolver for providing motor speed signals to an electronic control. The electronic control provides motor speed control and, by controlling the speed of the electric motor, fuel flow proportional to motor speed is achieved.

A still further aspect of the invention is to provide a piston pump that has a very high volumetric efficiency and very low leakage so that the amount of fuel pumped per revolution of the piston pump is a known constant.

According to an aspect of the invention, the piston pump pumps the same volume of fuel independent of output pressure. The amount of leakage in a piston pump is very low.

Another feature of the invention is that the electric motor is driven by an electronic speed control wherein by controlling motor speed, fuel flow to the turbine engine is controlled, and fuel flow is directly proportional to the speed of the motor.

Additionally, in the present invention, an aspect of the system is that it seeks precision of the fuel control so that an accuracy of better than +/−3% over a 40:1 fuel flow range can be achieved.

BRIEF DESCRIPTION OF THE DRAWINGS

A preferred structural embodiment and preferred subcomponents of this invention are disclosed in the accompanying drawing in which.

DESCRIPTION OF THE INVENTION

Figure 1:
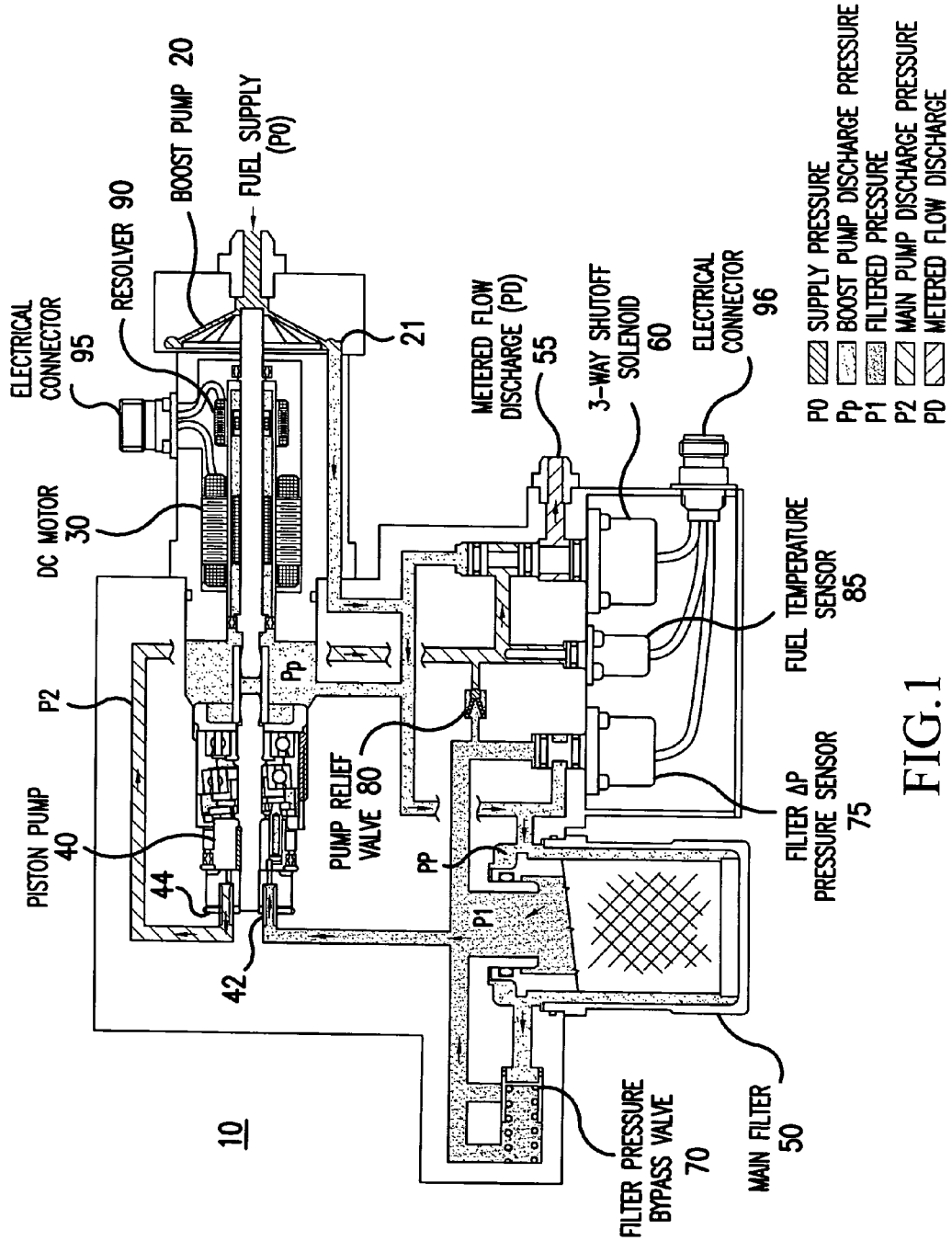
FIG. 1 illustrates a schematic view of a fuel control system in accordance with the present invention.

With reference to the figure, fuel from a fuel tank (not shown) enters a fuel control system of the present invention, generally indicated by the reference numeral 10, at a fuel inlet with a fuel supply pressure (P0). After entering the inlet, the fuel supply pressure (P0) is increased by a centrifugal boost pump 20. The centrifugal pump is utilized in this embodiment. A variable speed brushless DC motor 30 drives the boost pump 20. Also, the motor 30 drives a piston pump 40.

The fuel exits the boost pump 20 through boost pump outlet 21. This fuel is at a boost pump discharge pressure (PP) and is sent to the outside of a main fuel filter 50. This boost pump discharge pressure (PP) also includes leakage flow from the piston pump 40 and boost pump 20 and is used to keep the motor 30 cool.

After passing through the main fuel filter 50, the fuel is at a filtered pressure (P1) and enters inlet 42 of the piston pump 40. The piston pump 40 driven by the electric motor 30 boosts the pressure of the fuel and the fuel flow is now indicated as main pump discharge pressure (P2) in the Figure as it exits an outlet 44 of the piston pump 40.

The piston pump 40 will have performed two functions at this point. First, the pump 40 will have boosted the fuel pressure to levels required by the turbine engine (not shown). The other function of the piston pump 40 is to meter the amount of fuel delivered to the turbine engine.

Since the amount of the fuel pumped by the piston pump 40 per revolution is constant, the fuel flow to the turbine engine is controlled by the speed of the motor 30. At the outlet 44 of the piston pump 40, the main pump discharge pressure (P2) is directed to a metered flow discharge port 55 through a solenoid 60.

The solenoid 60, in one embodiment of the present invention, is a 3-way design that directs flow to the discharge port 55 in the "on" condition or returns fuel flow to the inlet of the fuel filter 50 in the "off" condition. The solenoid 60 provides an independent on and off control of fuel to the turbine engine.

Other devices in the fuel control system 10 include a filter bypass valve 70, a filter differential pressure sensor 75, a pump relief valve 80 and a fuel temperature sensor 85.

The fuel filter pressure bypass valve 70 is a spring loaded valve that opens should the main fuel filter 50 become plugged with dirt and debris. This bypass valve 70 permits the control system 10 to keep pumping fuel under emergency conditions when the fuel filter 50 is plugged. The filter differential pressure sensor 85 is used to provide a signal to the aircraft that the filter pressure is increasing and may be nearing the plugged condition. This would trigger maintenance action to change the filter.

The pump relief valve 80 is strictly a safety device to prevent extremely high pressures from being developed should the metered flow discharge port 55 be inadvertently blocked.

The fuel temperature sensor 85 is used to provide a signal that is proportional to fuel temperature. Since the piston pump 40 provides a flow volume proportional to speed, knowledge of fuel temperature can be used to calculate mass flow as a function of speed.

The electric motor 30 is a three phase brushless DC motor, in this embodiment. A resolver 90 is used to provide a signal to an electronic control (not shown) which provides motor speed control. In fact, there are two electrical connectors 95 and 96 that provide signals to the electronic control and are used to operate this unit. Connector 95 provides power to the motor and motor signals from the resolver 90 to provide feedback information for motor control. Connector 96 provides electrical connection to the shutoff solenoid 60, the fuel temperature sensor 85 and the filter differential pressure sensor 75.

The key to making the system work is the piston pump 40. This type of pump has very high volumetric efficiency. Therefore, the leakage from the pump to supply fuel pressure (PP) is very low and the amount of fuel pumped per revolution of the pump 40 is a known constant.

For this type of pump 40, the leakage is also fairly independent of output pressure. Therefore, the pump 40 always pumps the same volume of fuel independent of output pressure. This characteristic makes it ideal for turbine engine fuel controls. The electric motor 30 is driven by an electronic speed control. By controlling motor speed, fuel flow to the turbine engine is controlled. In the present invention, fuel flow is directly proportional to motor speed.

The main advantage of this system is the precision of fuel control that can be achieved with an accuracy of better than +/−3% over a 30:1 fuel flow range. Using fuel temperature as a correction factor, computations can be made to convert volumetric flow to mass flow and to allow for estimating pump leakage as a function of fuel temperature.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fuel control system for metering fuel in a turbine engine, said system comprising:
    a boost pump receiving fuel from a fuel tank and increasing pressure of the fuel;
    a piston pump including first and second pistons slidably and rotatably mounted in a housing for boosting the fuel pressure to levels required by the turbine engine and for metering an amount of fuel delivered to the turbine engine; and
    a speed controlled electric motor driving said piston pump.

2. The fuel control system of claim 1, wherein the amount of the fuel pumped by said piston pump per revolution is constant, and the fuel flow to the engine is controlled by the speed of said motor.

3. The fuel control system of claim 1, wherein said motor is a variable speed brushless DC motor and said motor drives both said boost pump and said piston pump.

4. A fuel control system for metering fuel in a turbine engine, said system comprising:
    a boost pump receiving fuel from a fuel tank and increasing pressure of the fuel;
    a piston pump for boosting the fuel pressure to levels required by the turbine engine and for metering an amount of fuel delivered to the turbine engine; and
    a speed controlled electric motor driving said piston pump; said system further comprising:
    a solenoid for directing flow of the fuel to a discharge port when said solenoid is in "on" condition or returns the fuel to an inlet of a fuel filter when said solenoid is in the "off" condition, wherein said solenoid providing an independent on/off control of fuel to the turbine engine.

5. The fuel control system of claim 4, wherein said system further comprising:
    a filter bypass valve for opening should the fuel filter become plugged with dirt and debris;
    a filter differential pressure sensor for providing a signal to an aircraft of the turbine engine that filter pressure is increasing and may be nearing a plugged condition;
    a pump relief valve for preventing extremely high pressures from being developed should the metered flow discharge port be inadvertently be blocked; and
    a fuel temperature sensor for providing a signal proportional to fuel temperature, wherein
    said piston pump provides a flow volume proportional to speed, and the fuel temperature being used to calculate mass flow as a function of speed.

6. The fuel control system of claim 5, wherein said fuel filter pressure bypass valve is a spring loaded valve which bypasses fuel around the fuel filter if the filter is plugged to keep fuel flowing to the piston pump under emergency conditions.

7. A fuel control system for metering fuel in a turbine engine, said system comprising:
    a boost pump receiving fuel from a fuel tank and increasing pressure of the fuel;
    a piston pump for boosting the fuel pressure to levels required by the turbine engine and for metering an amount of fuel delivered to the turbine engine; and
    a speed controlled electric motor driving said piston pump;
    wherein said electric motor is a three phase brushless DC motor and said boost pump is centrifugal.

8. The fuel control system of claim 7, wherein said system further comprises a resolver for providing signals to an electronic control that provides motor speed control, wherein by controlling the speed of the electric motor a fuel flow proportional to motor speed is achieved.

9. The fuel control system of claim 1, wherein said piston pump has a very high volumetric efficiency and leakage is very low so that an amount of fuel pumped per revolution of said piston pump is a known constant.

10. The fuel control system of claim 1, wherein said piston pump pumps the same volume of fuel independent of output pressure.

11. The fuel control system of claim 1, wherein said electric motor is driven by an electronic speed control wherein by controlling motor speed, fuel flow to the turbine engine is controlled, and fuel flow is directly proportional to the speed of said motor.

12. The fuel control system of claim 1, wherein said system seeks precision of fuel control that can be achieved with an accuracy of better than +/−3% over a 40:1 fuel flow range.

* * * * *